United States Patent
Luo et al.

(10) Patent No.: US 10,720,625 B2
(45) Date of Patent: *Jul. 21, 2020

(54) LITHIUM-SULFUR BATTERY SEPARATOR

(71) Applicants: Tsinghua University, Beijing (CN); HON HAI PRECISION INDUSTRY CO., LTD., New Taipei (TW)

(72) Inventors: Yu-Feng Luo, Beijing (CN); Jia-Ping Wang, Beijing (CN); Shou-Shan Fan, Beijing (CN)

(73) Assignees: Tsinghua University, Beijing (CN); HON HAI PRECISION INDUSTRY CO., LTD., New Taipei (TW)

(*) Notice: Subject to any disclaimer, the term of this patent is extended or adjusted under 35 U.S.C. 154(b) by 74 days.

This patent is subject to a terminal disclaimer.

(21) Appl. No.: 16/143,481

(22) Filed: Sep. 27, 2018

(65) Prior Publication Data
US 2019/0123327 A1    Apr. 25, 2019

(30) Foreign Application Priority Data
Oct. 18, 2017  (CN) .......................... 2017 1 0971529

(51) Int. Cl.
| | |
|---|---|
| *H01M 2/16* | (2006.01) |
| *H01M 4/38* | (2006.01) |
| *H01M 10/05* | (2010.01) |
| *H01M 10/052* | (2010.01) |
| *B82Y 30/00* | (2011.01) |

(52) U.S. Cl.
CPC ......... *H01M 2/1686* (2013.01); *H01M 2/162* (2013.01); *H01M 2/1613* (2013.01); *H01M 2/1646* (2013.01); *H01M 4/38* (2013.01); *H01M 10/052* (2013.01); *B82Y 30/00* (2013.01)

(58) Field of Classification Search
None
See application file for complete search history.

(56) References Cited

U.S. PATENT DOCUMENTS

| | | | |
|---|---|---|---|
| 2011/0165466 A1* | 7/2011 | Zhamu | ................... B82Y 30/00 429/231.8 |
| 2019/0123328 A1* | 4/2019 | Luo | ..................... H01M 2/1613 |

FOREIGN PATENT DOCUMENTS

| | | | |
|---|---|---|---|
| CN | 105489818 A | 4/2016 | |
| EP | 3170921 | * 5/2017 | ............... C25B 1/04 |

OTHER PUBLICATIONS

Luo et al., Application of molybdenum diphosphate / carbon nanotube multifunctional composite interlayer in lithium sulfur battery, Summary of papers of 2017 lithium sulfur battery cutting edge academic seminar, p. 101, Jun. 30, 2017.

* cited by examiner

Primary Examiner — Jonathan Crepeau
Assistant Examiner — Angela J Martin
(74) Attorney, Agent, or Firm — ScienBiziP, P.C.

(57) ABSTRACT

A lithium-sulfur battery separator includes a PSL and a FL. The FL is located on a surface of the PSL. The FL comprises carbon nanotube structure and a plurality of $MoP_2$ nanoparticles. The carbon nanotube structure defines a plurality of micropores. The plurality of $MoP_2$ nanoparticles is located on surface of the carbon nanotube structure and filled in micropores in the carbon nanotube structure.

15 Claims, 10 Drawing Sheets

LITHIUM-SULFUR BATTERY SEPARATOR

CROSS-REFERENCE TO RELATED APPLICATIONS

This application claims all benefits accruing under 35 U.S.C. § 119 from China Patent Application No. 201710971529.1, filed on Oct. 18, 2017, in the China Intellectual Property Office, the contents of which are hereby incorporated by reference. The application is also related to copending applications entitled, "LITHIUM-SULFUR BATTERY", filed Sep. 27, 2018 (Ser. No. 16/143,500); "LITHIUM-SULFUR BATTERY SEPARATOR", filed Sep. 27, 2018 (Ser. No. 16/143,502); "LITHIUM-SULFUR BATTERY", filed Sep. 27, 2018 (Ser. No. 16/143,503); "LITHIUM-SULFUR BATTERY SEPARATOR", filed Sep. 27, 2018 (Ser. No. 16/143,504); and "LITHIUM-SULFUR BATTERY", filed Sep. 27, 2018 (Ser. No. 16/143,506); all of which are listed on the filed Application Data Sheet.

FIELD

The present disclosure relates to a lithium-sulfur battery separator.

BACKGROUND

In a lithium-sulfur battery, the cathode is made of sulfur and the anode is made of elemental lithium. During electrical discharge process, the elemental lithium loses electrons to become lithium-ion, and the sulfur reacts with the lithium-ion and electrons to produce lithium sulfides. A reaction equation is: $S_8+16Li^++16e^{-1}=8Li_2S$. A lithium-sulfur battery has advantages of low-cost, environmental friendliness, good safety, and high theoretical specific capacity.

A separator is an important component in the lithium-sulfur battery. The separator separates the cathode and the anode to avoid an internal short-circuit. A conventional lithium-sulfur battery separator is polypropylene (PP), polyethylene (PE) or other non-polar film. However, polysulfides ($Li_2S_x$, $4 \leq x \leq 8$) formed during an electrical discharge process can be easily dissolved into an electrolyte, which affects a cyclic performance and a coulombic efficiency of the lithium-sulfur battery. It is difficult for conventional lithium-sulfur battery separators to inhibit polysulfide diffusion. With a great loss of active sulfur, a "shuttle effect" occurs between electrodes. Thus the specific capacity and cycling stability of the lithium-sulfur battery would be limited.

Therefore, there is room for improvement within the art.

BRIEF DESCRIPTION OF THE DRAWINGS

Implementations of the present technology will now be described, by way of example only, with reference to the attached figures, wherein.

DETAILED DESCRIPTION

Figure 1:
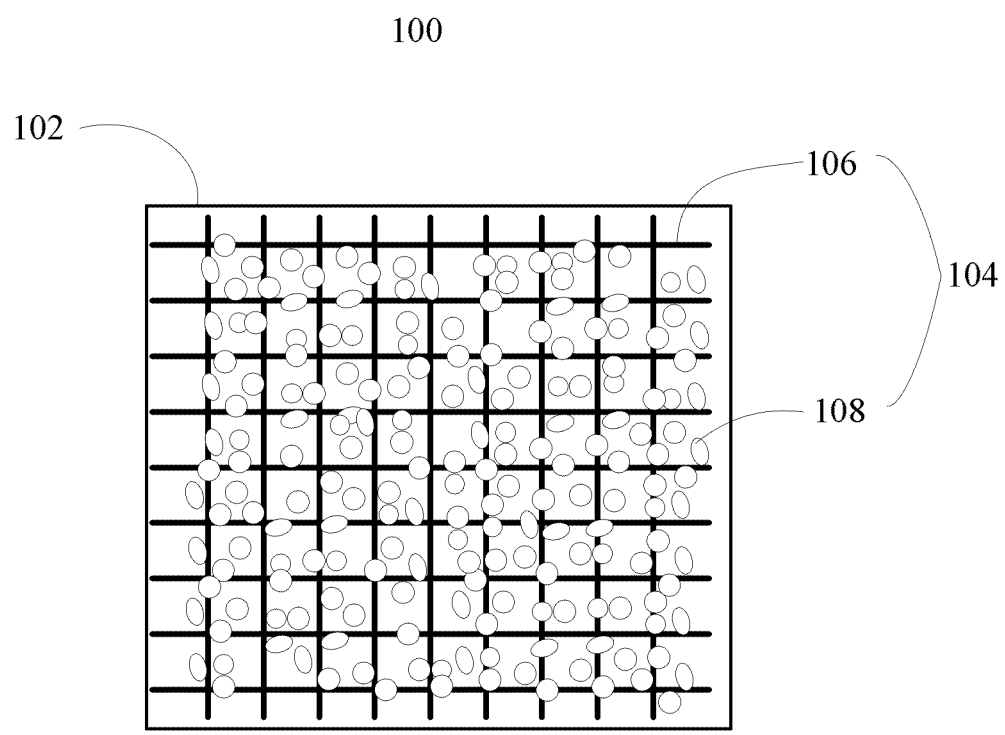
FIG. 1 is a view of one embodiment of a lithium-sulfur battery separator.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to illustrate details and features of the present disclosure better.

Several definitions that apply throughout this disclosure will now be presented.

The term "substantially" is defined to be essentially conforming to the particular dimension, shape, or other feature which is described, such that the component need not be exactly or strictly conforming to such a feature. The term "comprise," when utilized, means "include, but not necessarily limited to"; it specifically indicates open-ended inclusion or membership in the so-described combination, group, series, and the like.

Figure 2:
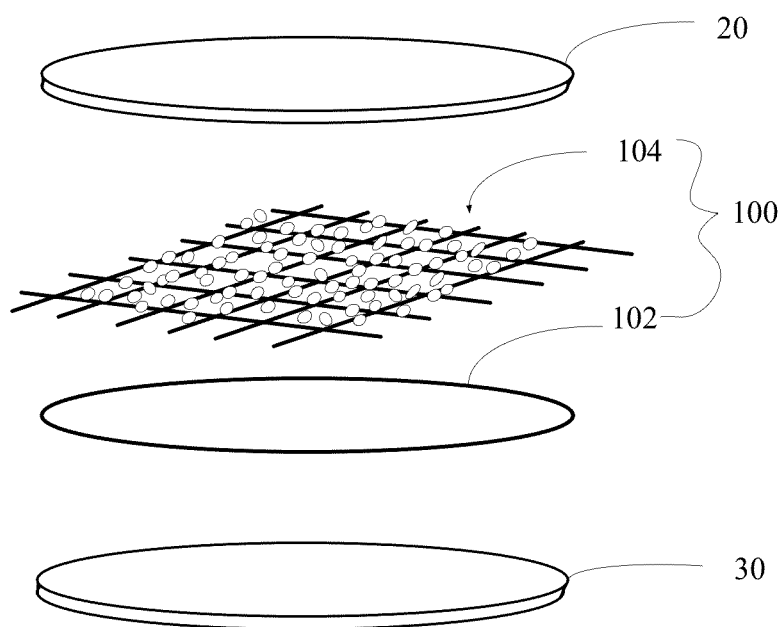
FIG. 2 is a schematic view of one embodiment of a lithium-sulfur battery using the lithium-sulfur battery separator of FIG. 1.

FIGS. 1 and 2 show one embodiment of a lithium-sulfur battery 10. The lithium-sulfur battery 10 includes a cathode 20, an anode 30, a lithium-sulfur battery separator 100, and an electrolyte (not shown). The electrolyte is located between the cathode 20 and the anode 30. The lithium-sulfur battery separator 100 is located between the cathode 20 and the anode 30 and is located in the electrolyte. The lithium-sulfur battery separator 100 includes a pristine separator (hereinafter PSL) 102 and a functional layer (hereinafter FL) 104 stacked with each other. The FL 104 is disposed opposite the cathode 20, that is, the FL 104 is located between the cathode 20 and the PSL 102. In this embodiment, the FL 104 is sandwiched by the cathode 20 and the PSL 102, and the FL 104 is located on the surface of the cathode 20. That is, the FL 104 and one surface of the cathode 20 are in direct contact with each other.

The cathode 20 can be made of sulfur or composite material containing sulfur. The anode 30 can be metallic lithium. In one embodiment, the anode 30 is a lithium sheet. The electrolyte may be a solid electrolyte or a liquid electrolyte. A material of the electrolyte can be selected from the electrolyte materials commonly, currently used in lithium-sulfur batteries. In one embodiment, the electrolyte is prepared by magnetically stirring 1 Mol bis-trifluoromethane sulfonamide lithium (LiTFSI) and 0.1 Mol lithium nitrate ($LiNO_3$) in a solvent with mixed dioxolane (DOL) and dimethyl ether (DME) for 2 hours. In the mixed solvent, a volume ratio between DOL and DME is 1:1.

FIG. 2 shows the lithium sulfur battery separator 10 including a PSL 102 and a FL 104. The PSL 102 is a planar structure and is a film. The PSL 102 defines a first surface and a second surface disposed opposite the first surface. The first surface is opposite with the cathode 20 and the second surface is opposite with the anode 30. The FL 104 is located on the first surface. The FL 104 is located between the cathode 20 and the first surface of PSL 102.

The PSL 102 can be a polyolefin microporous film, such as a polypropylene (PP) membrane, a polyethylene (PE) membrane, or a multilayer composite membrane of PP and PE. The PSL 102 defines a plurality of micropores through the first surface and the second surface. In this embodiment, the PSL 102 is a porous polypropylene film 25 microns thick.

The FL 104 includes a carbon nanotube structure 106 and a plurality of $MoP_2$ nanoparticles 108. That is, the FL 104 is a $CNT/MoP_2$ layer. The carbon nanotube structure 106 includes a plurality of carbon nanotubes, and the plurality of $MoP_2$ nanoparticles 108 are adsorbed on surfaces of the plurality of carbon nanotubes and supported by the carbon nanotube structure 106. In some embodiments, the FL 104 only includes carbon nanotubes and $MoP_2$ nanoparticles 108, and does not contain other materials. The FL 104 has 3 microns to 5 microns thick.

The carbon nanotube structure 106 is a net-like structure having a plurality of micropores. The carbon nanotube structure 106 includes a plurality of carbon nanotubes. The plurality of carbon nanotubes are uniformly distributed in the carbon nanotube structure 106. The carbon nanotubes in the carbon nanotube structure 106 can be joined with each other by van der Waals attractive force therebetween. The carbon nanotubes can be disorderly or orderly arranged in the carbon nanotube structure 106. The term 'disorderly' describes the carbon nanotubes being arranged along many different directions, such that the number of carbon nanotubes arranged along each different direction can be almost the same (e.g. uniformly disordered), and/or entangled with each other. The term 'orderly' describes the carbon nanotubes being arranged in a consistently systematic manner, e.g., the carbon nanotubes are arranged approximately along a same direction and or have two or more sections within each of which the carbon nanotubes are arranged approximately along a same direction (different sections can have different directions). The carbon nanotubes in the carbon nanotube structure 106 can be single-walled, double-walled, or multi-walled carbon nanotubes. The thickness of the carbon nanotube structure 106 is not limited, and can be in a range from about 0.5 nanometers to about 1 centimeter. In one embodiment, the carbon nanotube structure 106 is 1 micrometer to about 10 micrometers thick. The carbon nanotube structure 106 can include at least one drawn carbon nanotube film, flocculated carbon nanotube film or pressed carbon nanotube film.

The drawn carbon nanotube film includes a plurality of successive and oriented carbon nanotubes joined end-to-end by van der Waals attractive force therebetween. The carbon nanotubes in the carbon nanotube film can be substantially aligned in a single direction. The drawn carbon nanotube film can be formed by drawing a film from a carbon nanotube array that is capable of having a film drawn therefrom. The plurality of carbon nanotubes in the drawn carbon nanotube film are arranged substantially parallel to a surface of the drawn carbon nanotube film. A large number of the carbon nanotubes in the drawn carbon nanotube film can be oriented along a preferred orientation, meaning that a large number of the carbon nanotubes in the drawn carbon nanotube film are arranged substantially along the same direction. An end of one carbon nanotube is joined to another end of an adjacent carbon nanotube arranged substantially along the same direction, by van der Waals attractive force. A small number of the carbon nanotubes are randomly arranged in the drawn carbon nanotube film, and has a small if not negligible effect on the larger number of the carbon nanotubes in the drawn carbon nanotube film arranged substantially along the same direction. The drawn carbon nanotube film is capable of forming a free-standing structure. The term "free-standing structure" includes, but is not limited to, a structure that does not have to be supported by a substrate. For example, a free-standing structure can sustain the weight of itself when it is hoisted by a portion thereof without any significant damage to its structural integrity. So, if the drawn carbon nanotube film is placed between two separate supporters, a portion of the drawn carbon nanotube film, not in contact with the two supporters, would be suspended between the two supporters and yet maintain film structural integrity. The free-standing structure of the drawn carbon nanotube film is realized by the successive carbon nanotubes joined end to end by van der Waals attractive force. Microscopically, in the drawn carbon nanotube film, the carbon nanotubes oriented substantially along the same direction may not be perfectly aligned in a straight line, and some curve portions may exist. It can be understood that a contact between some carbon nanotubes located substantially side by side and oriented along the same direction can not be totally excluded. The drawn carbon nanotube film can be a pure structure only including the carbon nanotubes. The drawn carbon nanotube film has 0.5 nanometers to 100 micrometers. The width and length of the drawn carbon nanotube film is not limited. When the carbon nanotube structure 106 includes a plurality of drawn carbon nanotube films, an angle between the aligned directions of the carbon nanotubes in at least two drawn carbon nanotube films can be in a range from about 0 degrees to about 90 degrees, for example can be equal to about 0 degrees, 15 degrees, 45 degrees, 60 degrees, or 90 degrees. In one embodiment, the carbon nanotube structure 106 includes 20 layers of drawn carbon nanotube films overlapped with each other, and carbon nanotube structure 106 is 2 micrometers thick.

The flocculated carbon nanotube film can include a plurality of long, curved, disordered carbon nanotubes entangled with each other. The length of the carbon nanotube film can be greater than 10 centimeters. The carbon nanotubes can be randomly arranged and curved in the flocculated carbon nanotube film. The carbon nanotubes can be substantially uniformly distributed in the flocculated carbon nanotube film. The adjacent carbon nanotubes are acted upon by the van der Waals attractive force there between, thereby forming an entangled structure with micropores defined therein. Because the carbon nanotubes in the flocculated carbon nanotube film are entangled with each other, the flocculated carbon nanotube film has excellent durability, and can be fashioned into desired shapes with a low risk to the integrity of flocculated carbon nanotube film. The flocculated carbon nanotube film can be a free-standing structure due to the carbon nanotubes being entangled and adhered together by van der Waals attractive force there between. The flocculated carbon nanotube film is 1 micrometer to about 1 millimeter thick. It is also understood that many of the embodiments of the carbon nanotube structure are flexible and do not require the use of a structural support to maintain their structural integrity. The flocculated carbon nanotube film can be a pure carbon nanotube film only including carbon nanotubes.

The pressed carbon nanotube film can be formed by pressing a carbon nanotube array to slant the carbon nanotubes in the carbon nanotube array. The pressed carbon nanotube film can be a free-standing carbon nanotube film. The carbon nanotubes in the pressed carbon nanotube film are arranged along a same direction, along more than one predetermined different directions, or randomly arranged. The carbon nanotubes in the pressed carbon nanotube film can rest upon each other. Adjacent carbon nanotubes are attracted to each other and joined by van der Waals attractive force. An angle between a primary alignment direction of the carbon nanotubes and a surface of the pressed carbon nanotube film is about 0 degrees to approximately 15 degrees. In some embodiments, the angle between a primary alignment direction of the carbon nanotubes and a surface of the pressed carbon nanotube film is between 0 degrees and 15 degrees. The greater the pressure applied, the smaller the angle obtained. The pressed carbon nanotube film is about 1 micrometer to about 1 millimeter thick. The pressed carbon nanotube film can be pure carbon nanotube film only including carbon nanotubes. The length and width of the pressed carbon nanotube film depend on the carbon nanotube array that is pressed. If the length and width of the carbon nanotube array is large, the pressed carbon nanotube film can have large length and width.

The $MoP_2$ nanoparticles 108 are not limited in shape and are nanometer in size. The plurality of $MoP_2$ nanoparticles 108 are attached to the carbon nanotube structural structure 106, attached on the surfaces of the carbon nanotubes and filled in the micropores of the carbon nanotube structure 106. Preferably, the plurality of $MoP_2$ nanoparticles 108 are evenly distributed on the carbon nanotube structure 106. Diameters of the $MoP_2$ nanoparticles 108 may be between 10 nm-500 nm. In one embodiment, the plurality of $MoP_2$ nanoparticles 108 have an average diameter of 100 nm.

In the lithium-sulfur battery separator 100, an areal density of the plurality of $MoP_2$ nanoparticles 108 (a mass of the $MoP_2$ nanoparticles 108 in per unit area of the lithium-sulfur battery separator 100) is not limited, and can be adjusted according to actual needs. Preferably, the areal density of the plurality of $MoP_2$ nanoparticles 108 are ranged from 0.1 $mg/cm^2$ to 0.6 $mg/cm^2$. In one embodiment, the areal density of the plurality of $MoP_2$ nanoparticles 108 is about 0.3 mg/cm 2, a mass ratio between the plurality of $MoP_2$ nanoparticles 108 and the carbon nanotube structure 106 in the lithium-sulfur battery separator 100 is 7.5:1.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

A method for preparing the lithium-sulfur battery separator 100 may include at least the following steps: providing the PSL 102; laying the carbon nanotube structure 106 on a surface of the PSL 102; and uniformly depositing a suspension of the $MoP_2$ nanoparticle 108 on the carbon nanotube structure 106, after drying, a plurality of $MoP_2$ nanoparticles 108 are attached on the surfaces of the carbon nanotubes in the carbon nanotube structure 106. The plurality of $MoP_2$ nanoparticles 108 are located on the surface of the carbon nanotube structure 106 or in the micropores of the carbon nanotube structure 106.

The lithium-sulfur battery 10 provided by the present invention uses a special separator, that is, the lithium-sulfur battery separator 100. The lithium-sulfur battery separator 100 includes a PSL 102 and a FL 104. The FL 104 includes a carbon nanotube structure 106 and a plurality of $MoP_2$ nanoparticles 108, and the FL 104 is disposed opposite the cathode 20 of the lithium sulfur battery 10. During the charging and discharging process of the lithium-sulfur battery 10, a plurality of $MoP_2$ nanoparticles 108 act as a fixing agent to chemically react with the dissolved polysulfide to achieve the effect of adsorbing polysulfide; meanwhile, the plurality $MoP_2$ nanoparticles 108 also act as a catalyst to improve redox reaction of the polysulfide to reduce the polysulfide content in the electrolyte. Additionally, the carbon nanotube structure 106 serves as a supporting skeleton for supporting the plurality of $MoP_2$ nanoparticles 108 to ensure the plurality of $MoP_2$ nanoparticles 108 is uniformly distributed. The carbon nanotube structure 106 also physically hinders polysulfide migration. Further, the carbon nanotube structure 106 is in contact with one surface of the cathode 20. Because of the good electrical conductivity of the carbon nanotubes, the carbon nanotube structure 106 can also be regarded as a current collector for providing the cathode 20 a rich electron passage. As such, the internal charge transfer resistance of the lithium-sulfur battery 10 is reduced. Test results show that the cyclic performance of the lithium-sulfur battery 10 using the lithium-sulfur battery separator 100 is significantly improved. A capacity attenuation per cycle is 0.152% at 0.2 C in 100 cycles; the capacity attenuation per cycle is 0.025% at 1 C in 500 cycles. The in-situ Raman spectroscopy also prove the adsorption effect of polysulfide by the FL 104 in the lithium-sulfur battery separator 100 and the catalysis effect of the MoP2 nanoparticles during charge and discharge.

Figure 3:
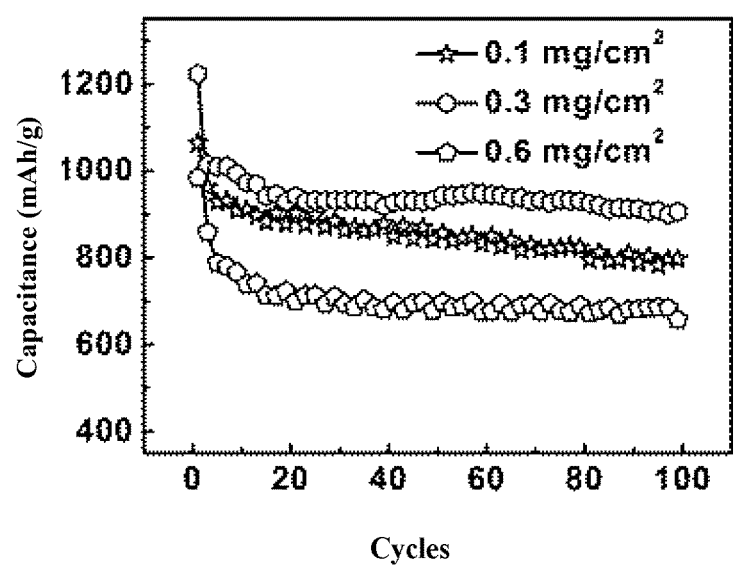
FIG. 3 is a graph showing cyclic performance of the lithium-sulfur battery using the lithium-sulfur battery separator (battery with $MoP_2$/CNT separator) with functional layer (FL) having different $MoP_2$ nanoparticles surface density.

FIG. 3 shows the areal density of the $MoP_2$ nanoparticles 108 is also an important parameter affecting the electrochemical performance of the lithium-sulfur battery 10. The initial capacitance of the cathode 20 is the same. After 100 cycles, when the surface density of the $MoP_2$ nanoparticles 108 in the lithium-sulfur battery separator 100 is low (0.1 $mg/cm^2$), the capacitance of the cathode 20 is attenuated to 783.9 mAh/g; when the areal density of $MoP_2$ nanoparticles 108 in the sulfur battery separator is high (0.6 $mg/cm^2$), the capacity of the cathode 20 is attenuated to 657.5 mAh/g; when the areal density of $MoP_2$ nanoparticles 108 in the lithium-sulfur battery separator 100 is at an intermediate value (0.3 $mg/cm^2$), the capacity of the cathode 20 is attenuated to 905.4 mAh/g. The above testing data indicates that, the areal density of the $MoP_2$ nanoparticles 108 is not the higher the better or worse. When the areal density is too low, the polysulfide may not be completely adsorbed; when the areal density is too high, the adsorbed polysulfide may be difficult to be released because of the strong interaction.

As such, the areal density of the $MoP_2$ nanoparticles is ranged from 0.1 mg/cm$^2$ to 0.6 mg/cm$^2$.

Comparing tests between lithium-sulfur battery 10 using lithium-sulfur battery separator 100 (battery with $MoP_2$/CNT separator) and a conventional lithium-sulfur battery using PSL (battery with PSL) are provided to prove the effect of the lithium-sulfur battery separator 100. In FIGS. 4-8, the curve corresponding to the $MoP_2$/CNT separator represents the battery with $MoP_2$/CNT separator provided by the present invention, and the curve corresponding to the PSL represents the battery with PSL provided by a comparative example. The diaphragm of the lithium-sulfur battery 10 provided by the present invention adopts the lithium-sulfur battery separator 100 including the PSL 102 and the FL 104; the conventional lithium-sulfur battery provided adopts a conventional lithium-sulfur battery separator only including the PSL 102. The conventional lithium-sulfur battery separator does not contain a FL. Other features of the lithium-sulfur battery 10 and the conventional lithium-sulfur battery are the same.

Figure 4:
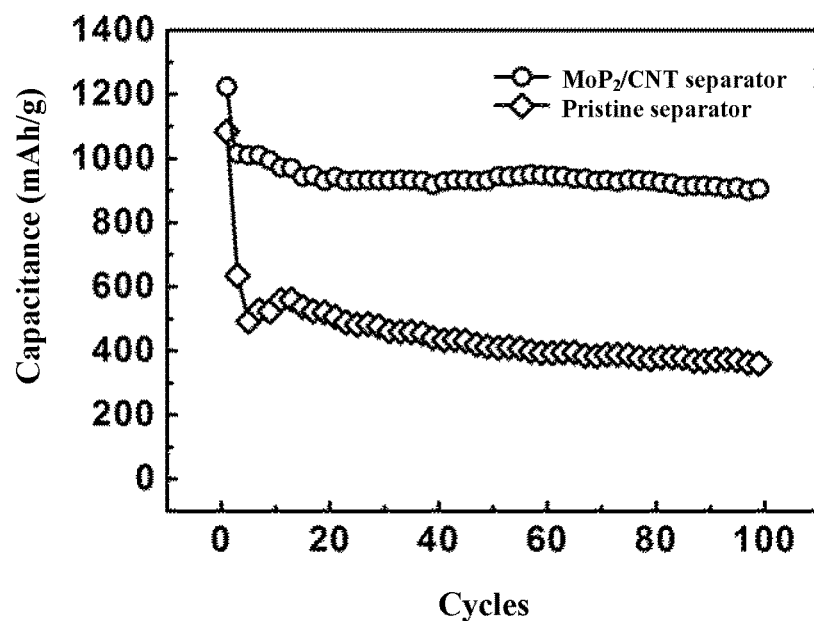
FIG. 4 is a graph comparing between the battery with $MoP_2$/CNT separator and a lithium sulfur battery with pristine separator (PSL) (battery with PSL) of a comparative example showing cyclic performance at certain current test result.

FIG. 4 is a graph comparing between the battery with $MoP_2$/CNT separator and a lithium sulfur battery with PSL (battery with PSL) of a comparative example showing cyclic performance at certain current test result. FIG. 4 shows the battery with $MoP_2$/CNT separator exhibits a higher cycle retention ratio than the battery with PSL. The initial specific discharge capacity of the battery with $MoP_2$/CNT separator is 1223.2 mAh/g, and after 100 cycles, the specific discharge capacity is attenuated to 905.4 mAh/g. That is, the capacity retention rate is 74.02%, wherein, after the second discharge cycle, each cycle capacity decay rate is only 0.152%. The battery with PSL provided in the comparative example has a battery capacity retention rate of 33.2% (360 mAh/g) after 100 cycles. Accordingly, the battery with $MoP_2$/CNT separator has a better cyclic performance, sufficient to demonstrate the effect of the sulfur-sulfur battery separator with the FL on the cyclic performance of the entire battery.

Figure 5:
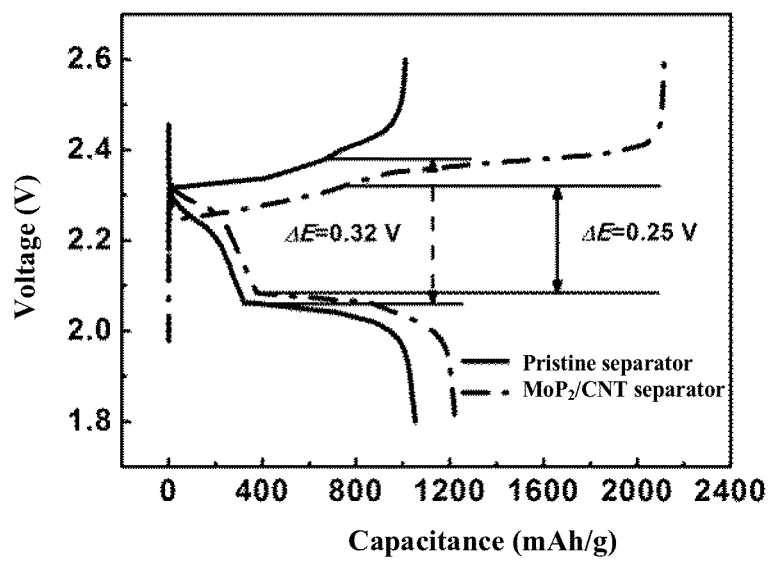
FIG. 5 is a graph comparing the battery with $MoP_2$/CNT separator and the battery with PSL showing the cyclic performance at a current density of 0.2 C.

FIG. 5 is a graph comparing the battery with $MoP_2$/CNT separator and the battery with PSL showing the cyclic performance at a current density of 0.2 C (1 C=1600 mA/g). In the voltage characteristic curves, a voltage hysteresis $\Delta E$ between a platform at the time of charging and a platform at the time of discharge is an important indicator of the electrochemical reversibility in the battery system. It can be seen from the figure that, the $\Delta E$ value of the lithium-sulfur battery with PSL is 0.32 V; the $\Delta E$ value of the lithium-sulfur battery with $MoP_2$/CNT separator is 0.25 V. The lower the $\Delta E$ value of the lithium-sulfur battery, the weaker the internal polarization of the battery, and the better the rate performance of the battery. The decrease in the $\Delta E$ value of the lithium-sulfur battery with $MoP_2$/CNT separator is mainly due to that the presence of $MoP_2$ nanoparticles in the lithium-sulfur battery separator improves the polysulfide conversion activity.

Figure 6:
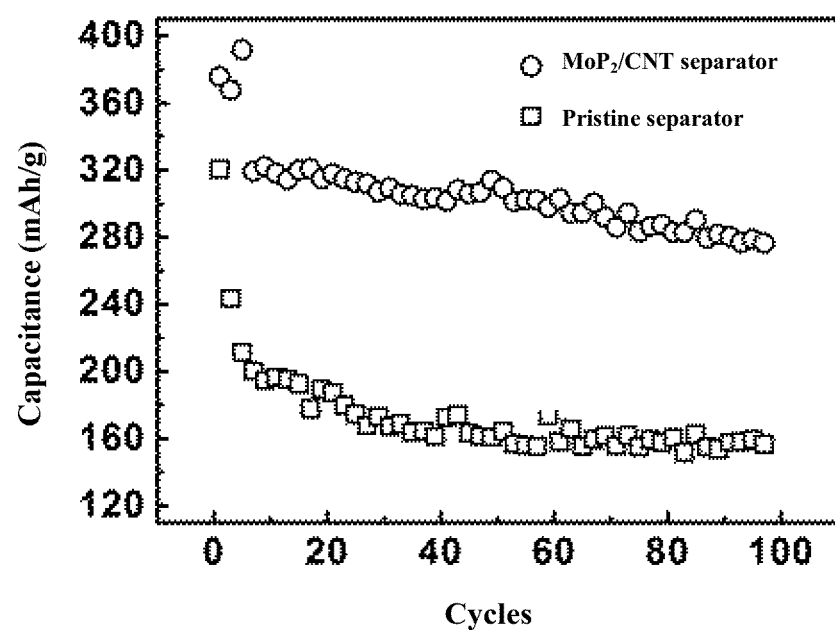
FIG. 6 is a graph comparing the battery with $MoP_2$/CNT separator and the battery with PSL showing a cyclic performance at high plateau capacity at 0.2 C.

FIG. 6 is a graph comparing between the battery with $MoP_2$/CNT separator and the battery with PSL showing a cyclic performance at high platform capacity at 0.2 C. In the lithium-sulfur battery, the high platform capacity corresponds to a process of conversion of elemental sulfur S to $Li_2S_4$. The higher the high platform capacity, the better the inhibition effect of the lithium-sulfur battery separator on the shuttle effect of polysulfide. FIG. 6 shows that, in the lithium-sulfur battery with $MoP_2$/CNT separator, the lithium sulfur battery separator has a better inhibitory effect on the shuttle effect of polysulfide.

Figure 7:
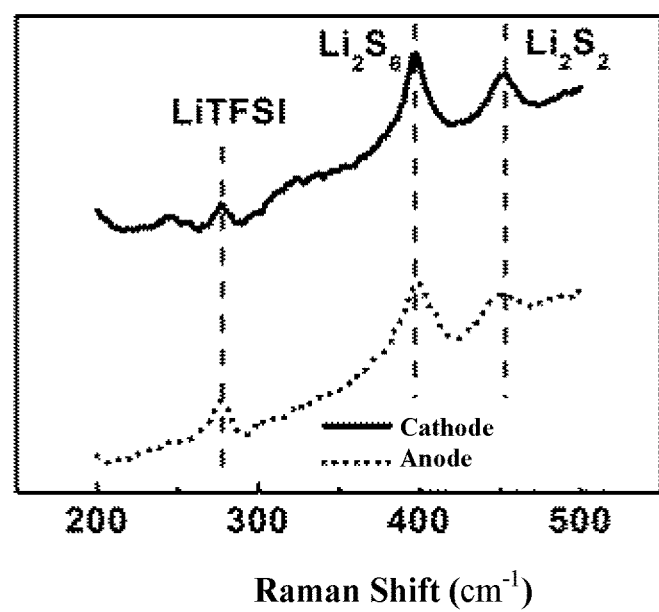
FIG. 7 is a graph showing In-situ Raman spectroscopy of the battery with PSL at 2.08 V.
Figure 8:
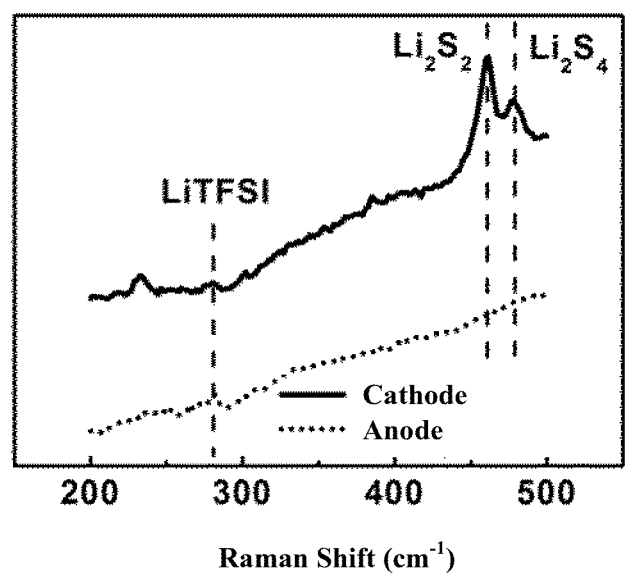
FIG. 8 is a graph showing In-situ Raman spectroscopy of the battery with $MoP_2$/CNT separator at 2.08 V.

FIG. 7 is a graph showing In-situ Raman spectroscopy of the battery with PSL at 2.08 V. FIG. 8 is a graph showing In-situ Raman spectroscopy of the battery with $MoP_2$/CNT separator at 2.08 V. For the lithium-sulfur battery with PSL. FIG. 7 shows peaks of $Li_2S_6$ and $Li_2S_2$ can be observed on both sides of the cathode and the anode, indicating that $Li_2S_6$ and $Li_2S_2$ substances on both sides of the cathode and anode. As such, the PSL does not inhibit the shuttle effect of polysulfide. For the lithium-sulfur battery with $MoP_2$/CNT separator, the peaks of $Li_2S_6$ and $Li_2S_2$ are observed only on the cathode side, and no polysulfide peak appears on the anode side, which indicates that the $MoP_2$/CNT separator the lithium-sulfur battery has a good inhibitory effect on the shuttle effect of polysulfide.

Another embodiment of the present invention provides a lithium sulfur battery comprising a cathode, an anode, a lithium-sulfur battery separator 200 and an electrolyte.

Figure 9:
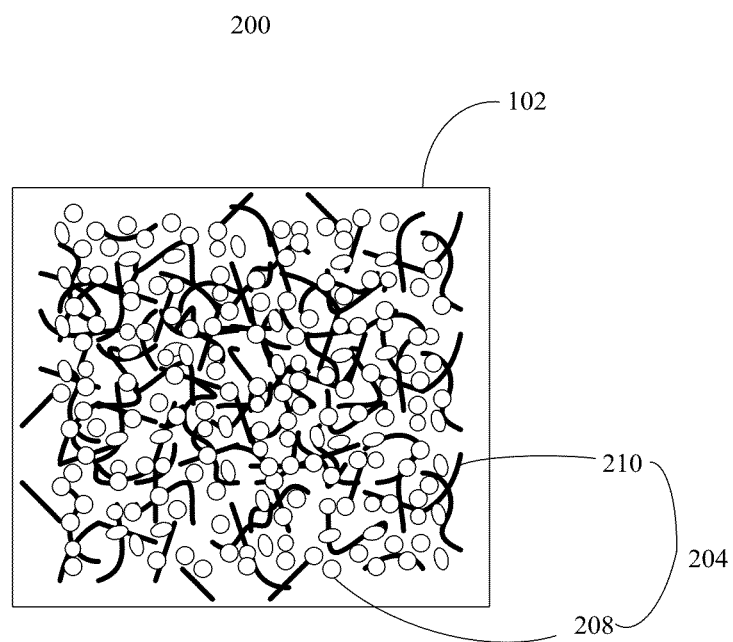
FIG. 9 a schematic view of another embodiment of a lithium-sulfur battery separator.

FIG. 9 shows the lithium-sulfur battery separator 200 provided in the second embodiment includes a PSL 202 and a FL 204. The PSL 202 is a film. The PSL 202 has a first surface and a second surface opposite with the first surface. The first surface is located opposite with the cathode, and the second surface is located opposite with the anode. The FL 204 is disposed on the first surface. The FL 204 is located between the cathode and the first surface of PSL 202.

The FL 204 includes a plurality of $MoP_2$ nanoparticles 208 and a plurality of carbon nanotubes 210. The plurality of $MoP_2$ nanoparticles 208 and the plurality of carbon nanotubes 210 are uniformly mixed with each other. The plurality of carbon nanotubes 210 can be entangled with each other. The $MoP_2$ nanoparticles 208 can also be entangled by the carbon nanotubes 210. The plurality of $MoP_2$ nanoparticles 208 and the plurality of carbon nanotubes 210 can be joined by van der Waals attractive force to form an integrity structure. In the lithium-sulfur battery separator 200, an areal density of the plurality of $MoP_2$ nanoparticles 108 is not limited and can be adjusted according to practical needs. In some embodiments, the plurality of $MoP_2$ nanoparticles 208 have an areal density ranged from 0.1 mg/cm$^2$ to 0.6 mg/cm$^2$.

In some embodiments, the FL 204 only includes $MoP_2$ nanoparticles 208 and carbon nanotubes 210, and does not contain other materials. In other embodiments, the FL 204 can further include conductive particles, such as, carbon black and graphene. Alternatively, the FL 204 can further include a binder for fixing the plurality of $MoP_2$ nanoparticles 208 and the plurality of carbon nanotubes 210.

A preparation method of the lithium-sulfur battery separator 200 includes at least the following steps: preparing a liquid mixture of $MoP_2$ nanoparticles 208 and carbon nanotubes 210, and stirring the mixture uniformly; providing a PSL 102, coating the liquid mixture of $MoP_2$ nanoparticles 208 and carbon nanotubes 210 on the first surface of the PSL 102, and to form the FL 204 after drying.

Other characteristics of the lithium-sulfur battery separator 200 is the same as the lithium-sulfur battery separator 100 discussed above.

A lithium sulfur battery comprising a cathode, an anode, a lithium-sulfur battery separator 300 and an electrolyte according to yet another embodiment is provided.

Figure 10:
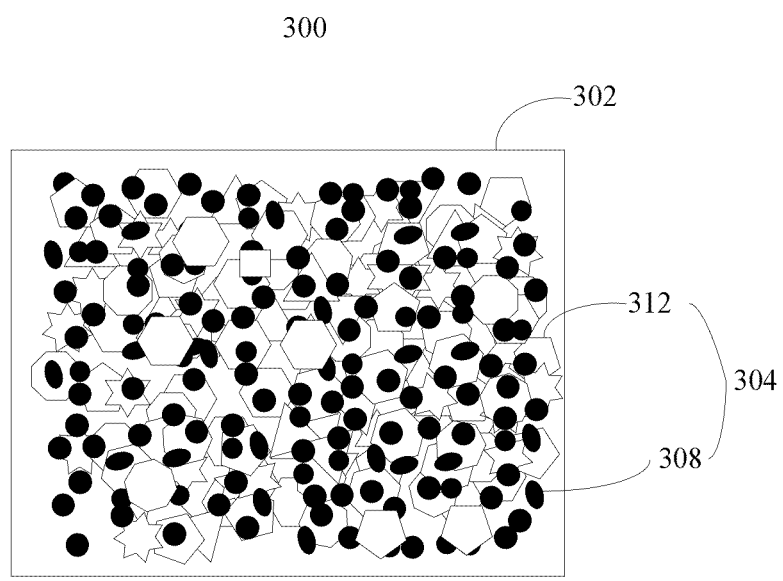
FIG. 10 a schematic view of yet another embodiment of a lithium-sulfur battery separator.

FIG. 10 shows the lithium-sulfur battery separator 300 includes a PSL 302 and a FL 304. The PSL 302 is a film having a certain thickness. The PSL 302 has a first surface and a second surface opposite with the first surface. The first surface is located opposite with the cathode, and the second surface is located opposite with the anode. The FL 304 is disposed on the first surface. The FL 304 is located between the cathode and the first surface of PSL 302.

The FL 304 includes a plurality of $MoP_2$ nanoparticles 308 and a plurality of graphene sheets 312. The plurality of $MoP_2$ nanoparticles 308 and the plurality of graphene sheets 312 are uniformly mixed with each other. The plurality of graphene sheets 312 can be overlapped or laminated to form an integral graphene layer. The plurality of $MoP_2$ nanoparticles 308 are attached to surfaces of the plurality of graphene sheets 312. In some embodiments, the FL 304 only includes $MoP_2$ nanoparticles 308 and graphene sheets 312, and does not contain other materials.

The graphene sheets 312 in the graphene layer are joined with each other by Van der Waals attractive force. The graphene sheets 312 in the graphene layer can be arranged side by side or overlapped with each other. Graphene sheets have good electrical conductivity. Thickness of graphene sheets 312 is less than 100 nm. In an embodiment, the graphene sheets 312 have a thickness ranged from 0.5 nm to 100 nm. The graphene layer is a single layer graphene sheet to 1 mm thick.

In the lithium-sulfur battery separator 300, an areal density of the plurality of MoP2 nanoparticles 108 is not limited, and can be adjusted according to actual needs. In some embodiments, the plurality of $MoP_2$ nanoparticles 208 have an areal density ranged from 0.1 $mg/cm^2$ to 0.6 $mg/cm^2$.

A method for preparing the lithium-sulfur battery separator 300 includes at least the following steps: providing a certain amount of graphene oxide sheets, placing the graphene oxide sheets into a solvent to form a mixture; ultrasonically shaking the mixture to make the graphene oxide sheets dispersed uniform to form a graphene oxide sheet dispersion; forming the graphene layer by suction filtration; transferring the graphene layer to the surface of the PSL 302; dropping a solvent including $MoP_2$ nanoparticles 108 on the graphene layer and then drying them.

In the lithium-sulfur battery separator 300, the plurality of MoP2 nanoparticles 308 and the plurality of graphene sheets 312 are uniformly distributed; the plurality of graphene sheets 312 are stacked to form a graphene layer to allow the electrolyte to pass smoothly, and also to hinder polysulfide migration.

Other characteristics of the lithium-sulfur battery separator 300 are the same as the lithium-sulfur battery separator 100 discussed above.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A lithium-sulfur battery separator comprising:
a pristine separating layer (PSL); and
a functioning layer (FL) located on a surface of the PSL, wherein the FL comprises:
a carbon nanotube structure defining a plurality of micropores, the carbon nanotube structure comprises a plurality of carbon nanotubes; and
a plurality of $MoP_2$ nanoparticles located on surface of the carbon nanotube structure and filled in the plurality of micropores in the carbon nanotube structure.

2. The lithium-sulfur battery separator of claim 1, wherein when the lithium-sulfur battery separator is used in a lithium-sulfur battery comprising an anode and a cathode, the FL facing the cathode.

3. The lithium-sulfur battery separator of claim 2, wherein the FL is located between the PSL and the cathode.

4. The lithium-sulfur battery separator of claim 3, wherein the FL is directly contacting with a surface of the cathode.

5. The lithium-sulfur battery separator of claim 1, wherein the carbon nanotube structure comprises a plurality of carbon nanotubes joined with each other by van der Waals attractive force therebetween.

6. The lithium-sulfur battery separator of claim 5, wherein the plurality of carbon nanotubes are oriented along a same direction.

7. The lithium-sulfur battery separator of claim 5, wherein the carbon nanotube structure comprises a plurality of successive and oriented carbon nanotubes joined end-to-end with each other by van der Waals attractive force therebetween.

8. The lithium-sulfur battery separator of claim 1, wherein the carbon nanotube structure comprises a plurality layers of carbon nanotube films stacked with each other.

9. The lithium-sulfur battery separator of claim 8, wherein each carbon nanotube film comprises a plurality of carbon nanotubes oriented along a same direction, an angle between the aligned directions of the plurality of carbon nanotubes in at least two carbon nanotube films is in a range from 0 degrees to about 90 degrees.

10. The lithium-sulfur battery separator of claim 1, wherein diameters of the plurality of $MoP_2$ nanoparticles are in a range from 10 nanometers to 500 nanometers.

11. The lithium-sulfur battery separator of claim 1, wherein an area density of the plurality of $MoP_2$ nanoparticles in the FL is in a range from 0.1 $mg/cm^2$ to 0.6 $mg/cm^2$.

12. The lithium-sulfur battery separator of claim 1, wherein the FL is 3 micrometers to 5 micrometers thick.

13. The lithium-sulfur battery separator of claim 1, wherein FL only comprises carbon nanotubes and $MoP_2$ nanoparticles.

14. The lithium-sulfur battery separator of claim 1, wherein the carbon nanotube structure is a free-standing structure.

15. The lithium-sulfur battery separator of claim 1, wherein the carbon nanotube structure is a supporting skeleton for supporting the plurality of $MoP_2$ nanoparticles.

* * * * *